UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING MAGNESIUM CHLORID AND THE LIKE.

1,209,245.  Specification of Letters Patent.  Patented Dec. 19, 1916.

No Drawing.  Application filed March 13, 1916.  Serial No. 83,880.

*To all whom it may concern:*

Be it known that I, EDWIN O. BARSTOW, a citizen of the United States, and a resident of Midland, county of Midland, State of Michigan, have invented a new and useful Improvement in Methods of Making Magnesium Chlorid and the like, of which the following is a specification, the principle of the invention being herein explained, and the best mode in which I have contemplated applying that principle, so as to distinguish it from other inventions.

In view of the increased demand for magnesium chlorid for use in the construction of floors, it is desirable to provide new and improved methods for production of this necessary ingredient.

The object of the present invention is thus to provide an improved method for manufacturing magnesium chlorid from natural brines, such as occur in the Michigan district and contain sodium chlorid and calcium chlorid, in addition to such magnesium chlorid, as well as a trace of iron chlorid. The latter may be neglected, so far as the present process is concerned, such process, then, consisting of the steps hereinafter described and particularly pointed out in the claims.

The following description sets forth in detail certain steps embodying the invention, such described steps constituting, however, but one of various ways in which the principle of the invention may be used.

Magnesium sulfite is sparingly soluble in water, but more soluble than calcium sulfite, and I have discovered that the calcium chlorid in the aforesaid brine can be replaced with magnesium chlorid by treating such brine with magnesium sulfite according to the following reaction:

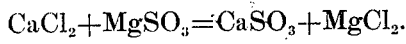

$$CaCl_2 + MgSO_3 = CaSO_3 + MgCl_2.$$

In carrying out the foregoing reaction in practice, I first provide the necessary magnesium sulfite by treating a quantity of the natural brine with milk of lime, in a tank provided with an agitator, the lime used being either pure calcium lime or a dolomitic lime. In either case the calcium hydrate in the milk of lime precipitates magnesium hydrate with the formation of an equivalent amount of calcium chlorid. Such hydrate is then allowed to settle, and, after being further filtered, is suspended in a suitable liquid, either water or more of the brine, and is thereupon treated with sulfur dioxid obtained by burning sulfur in a sulfur burner, as will be readily understood. The effect of this last-mentioned treatment is to convert the magnesium hydrate into magnesium sulfite, which remains suspended as a precipitate in the mixture, imparting to the latter the consistency of a thick cream. This mixture for convenience may be referred to as "magnesium sulfite reagent", and in making the same pains are taken to use just enough sulfur dioxid to form a normal magnesium sulfite ($MgSO_3$) and not the acid sulfite $MgH_2(SO_3)_2$. If too much sulfur dioxid is used, more magnesium hydrate is added, so as to give such normal sulfite. The next step is to take the magnesium sulfite reagent thus provided, and treat an additional quantity of the natural brine therewith. This gives a precipitate of calcium sulfite, the magnesium going into solution as magnesium chlorid, in accordance with the reaction previously given. Accordingly, after filtering off the calcium sulfite precipitate, a solution of sodium and magnesium chlorids is left. Where it is desired to use the magnesium chlorid as such, it is recovered from this solution by evaporating the same until the sodium chlorid separates out, which takes place at a gravity of about 34° Bé. The mother liquor, containing the magnesium chlorid, is then evaporated until it corresponds in composition to the chlorid, with water of crystallization ($MgCl_2.6H_2O$), when it is drawn off into drums and allowed to cool and solidify. Should it, on the other hand, be desired to obtain the magnesium in the form of a salt, for example the carbonate, which is insoluble in the combined solution, the latter is treated with sodium carbonate which precipitates the magnesium as magnesium carbonate. The latter may then be readily separated from the residual sodium chlorid solution by well-understood methods.

Instead of making the magnesium sulfite reagent separately, as indicated in the foregoing description of my improved process, and then removing the calcium from the natural brine by means of such sulfite, I may make magnesium hydrate of the magnesium chlorid constituent in the brine, mix the separated magnesium hydrate with more of the original brine, and then pass sulfur dioxid into such mixture, the products being calcium sulfite, in the form of a precipitate, and a solution of sodium and magnesium chlorids. The magnesium chlorid may either be utilized in the production of the chlorid, as such, or in the manufacture of magnesium carbonate, just as before. Also instead of treating the original brine with magnesium sulfite, I can, if desired, preliminarily evaporate such original brine to remove the salt, leaving a solution of calcium and magnesium chlorids, and then treat this solution with magnesium sulfite to convert the calcium chlorid to magnesium chlorid.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a method of making magnesium chlorid from a brine containing sodium chlorid and calcium chlorid in addition to magnesium chlorid, the steps which consist in precipitating the calcium chlorid therein as calcium sulfite, leaving a solution of sodium and magnesium chlorids; and then separating such last-named chlorids, substantially as described.

2. In a method of making magnesium chlorid from a brine containing sodium chlorid and calcium chlorid in addition to magnesium chlorid, the steps which consist in precipitating the calcium chlorid therein as calcium sulfite, leaving a solution of sodium and magnesium chlorids; evaporating such solution to a point where the sodium chlorid crystallizes out; and then separating out such crystallized sodium chlorid, leaving the magnesium chlorid in solution.

3. In a method of making magnesium chlorid from a brine containing sodium chlorid and calcium chlorid in addition to magnesium chlorid, the steps which consist in treating such brine with magnesium sulfite in amount sufficient to react with the calcium chlorid therein, whereby the latter is precipitated as calcium sulfite, leaving a solution of sodium and magnesium chlorids; and then separating such last-named chlorids, substantially as described.

4. In a method of making magnesium chlorid from a brine containing sodium chlorid and calcium chlorid in addition to magnesium chlorid, the steps which consist in treating such brine with magnesium sulfite in amount sufficient to react with the calcium chlorid therein, whereby the latter is precipitated as calcium sulfite, leaving a solution of sodium and magnesium chlorids; evaporating such solution to a point where the sodium chlorid crystallizes out; and then separating such crystallized sodium chlorid, leaving the magnesium chlorid in solution.

5. In a method of making magnesium chlorid from a brine containing sodium chlorid and calcium chlorid in addition to magnesium chlorid, the steps which consist in treating a quantity of such brine with milk of lime, whereby magnesium hydrate is precipitated; separating out such hydrate; treating such hydrate with sulfur dioxid, whereby magnesium sulfite is formed; adding such sulfite to an additional quantity of the brine in amount sufficient to react with the calcium chlorid therein, whereby the latter is precipitated as calcium sulfite and leaves a solution of sodium and magnesium chlorids; and then separating such last-named chlorids, substantially as described.

6. In a method of making magnesium chlorid from a brine also containing calcium chlorid, the step which consists in precipitating the calcium chlorid therein as calcium sulfite.

7. In a method of making magnesium chlorid from calcium chlorid in solution, the step which consists in treating such solution with magnesium sulfite in amount sufficient to react with the calcium chlorid therein, whereby such calcium chlorid in solution is replaced by magnesium chlorid.

Signed by me, this third day of March, 1916.

EDWIN O. BARSTOW.

Attested by—
Wm. W. Ross, Jr.,
G. L. Camp.